Patented Dec. 5, 1950

2,533,053

UNITED STATES PATENT OFFICE 2,533,053

PRODUCTION OF MONOHALOALKANES

Louis Schmerling, Riverside, Ill., assignor to Universal Oil Products Company, Chicago, Ill., a corporation of Delaware No Drawing. Application September 28, 1946, Serial No. 700,176

17 Claims. (Cl. 260—658)

This application is a continuation-in-part of my copending applications Serial Numbers 551,262 now abandoned, and 551,263 now abandoned, each filed August 25, 1944, and application Serial Number 600,216, now abandoned, filed June 18, 1945, each of which is a continuation-in-part of my application Serial Number 438,841, now abandoned, filed April 13, 1942.

This invention relates to the production of monohaloalkanes in which the halogen has an atomic weight of at least 35. More particularly, the process relates to the addition of a particular monoolefin to a monohaloalkane having at least three carbon atoms per molecule to produce a higher boiling monohaloalkane with a molecular weight equal to the sum of the molecular weights of the monoolefin and monohaloalkane charged to the process.

The process is concerned with a catalytic method of adding to a monoolefin or condensing therewith a monochloro-, monobromo- or monoiodoalkane having at least three carbon atoms per molecule.

In this specification the term "condensing" is used in referring to the process of chemically combining a monohaloalkane with at least three carbon atoms per molecule in which the halogen has an atomic weight of at least 35 with a monoolefin having at least one hydrogen atom combined with each of the carbon atoms joined by a double bond.

An object of this invention is to provide a process for manufacturing monohaloalkanes.

A further object of this invention is to provide a process for condensing a non-tert-monoolefin and a monohaloalkane containing a halogen with an atomic weight of at least 35 in the presence of a metal halide catalyst.

A further object of this invention is to provide a process for condensing a non-tert-monoolefin and a monohaloalkane in which the halogen had an atomic weight of at least 35 in the presence of a Friedel-Crafts metal halide catalyst.

One specific embodiment of the present invention comprises the process for producing a higher boiling monochloroalkane by condensing a lower boiling monohaloalkane and a mono-olefin having at least one hydrogen atom combined with each of the carbon atoms joined by the double bond, in the presence of a catalyst comprising as its essential active ingredient a Friedel-Crafts metal halide.

Another embodiment of this invention comprises a process for producing a higher boiling monobromoalkane by condensing a lower boiling monobromoalkane and a monoolefin having at least one hydrogen atom combined with each of the carbon atoms joined by the double bond at a reaction temperature and in the presence of a catalyst comprising as its essential active ingredient a Friedel-Crafts metal halide in which the halogen is a middle halogen.

The monohaloalkanes which are utilizable in my process contain at least three carbon atoms and only one halogen atom per molecule, this halogen having an atomic weight of at least 35 and thus being a member of the group consisting of chlorine, bromine, and iodine.

I have found that the monohaloalkanes having less than three carbon atoms per molecule, namely, the methyl and ethyl halides, do not add to or condense with olefins as aforementioned to produce higher boiling monohaloalkanes in the presence of a Friedel-Crafts catalyst but that such a reaction mixture yields olefin polymers as the principal product of the process.

The different monohaloalkanes which are usable in my process are usually referred to as primary, secondary, and tertiary alkyl halides or monohaloalkanes and may be represented by the following structural formulae wherein each of $R^1$, $R^2$ and $R^3$ represents a member of the group consisting of a hydrogen atom and an alkyl group and X represents a halogen atom with an atomic weight of at least 35.

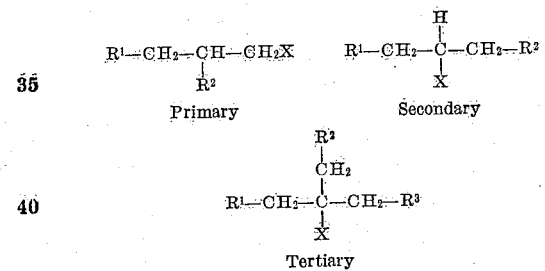

An aliphatic monoolefinic hydrocarbon which is condensed with a monohaloalkane in my process has at least one hydrogen atom combined with each of the carbon atoms joined by the double bond. Such aliphatic monoolefin may be illustrated by the formula

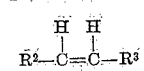

in which each of $R^2$ and $R^3$ represents a member of the group consisting of a hydrogen atom and an alkyl group. The monoolefin is a primary monoolefin when at least one of R² and R³ represents a hydrogen atom. The monoolefin is a secondary monoolefin when R² and R³ represent alkyl groups.

The monoolefins generally referred to as primary, secondary, and tertiary monoolefins have the following structural formula in which R and R¹ represent alkyl groups:

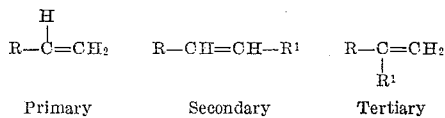

| Primary | Secondary | Tertiary |

A tertiary monoolefin which is a monoolefin in which there is no hydrogen atom combined with one of the carbon atoms joined by a double bond to another carbon atom sometimes has more of a tendency to polymerize than to add or condense with a monohaloalkane although the addition reaction may occur to a certain extent when tertiary alkyl halides are used. However, there is little utility in effecting the condensation of a tertiary alkyl chloride with a tertiary olefin since the same product can be obtained in better yield by polymerizing the olefin and then adding hydrogen chloride to the dimer.

Catalysts employed in my condensation process comprise Friedel-Crafts metal halides and particularly anhydrous aluminum chloride, aluminum bromide, ferric chloride, zirconium chloride, zinc chloride, bismuth chloride, stannic chloride, titanium tetrachloride, etc. These different catalytic materials may be used as such or they may be composited with one another or be deposited upon solid carriers or supporting materials to produce catalyst composited of desired activities. Suitable catalyst carriers or supports include both absorptive and substantially non-absorptive materials such as alumina, activated charcoal, crushed porcelain, diatomaceous earth, pumice, firebrick, etc. The carrier should be substantially inert in the sense that substantially no interaction which is detrimental to the activity or selectivity of the catalyst composite occurs between the carrier and metal halide.

In some cases, the catalyst may be employed in the form of a solution in a solvent such as a nitroparaffin or an ether. Solutions of this type are readily commingled with the reacting monohaloalkane and monoolefinic hydrocarbon. Obviously, the solvent chosen should be one which does not itself undergo undesirable reaction under the operating conditions utilized.

Sometimes it may be advisable also to mix with the reacting alkyl halide and olefin, a small amount of a peroxide, for example ascaridole, benzoyl peroxide, etc., to influence the manner in which an alkyl halide condenses with an olefin to produce higher boiling alkyl halides of desired structures.

Previous to my work, no condensation of monohaloalkanes with monoolefinic hydrocarbons in the presence of a metal halide catalyst of the Friedel-Crafts type has been reported. It was known, however, that a polyhaloalkane would condense with a haloolefin in the presence of the aluminum chloride catalyst. Thus chloroform and/or carbon tetrachloride were condensed previously with di-, tri-, and tetrachloroethylene, in the presence of an aluminum chloride catalyst. Later, other workers disclosed the condensation of 1,1-dichloroethane with a chloroethylene.

Theoretical reasons were given by one investigator to show that it would not be possible to condense a monohaloalkane with a monoolefin or even with a haloolefin. It was stated that a haloalkane requires strong activation and reacts only when its molecules are polarized by the presence of a plurality of halogen atoms, in other words, the haloalkane must be a polyhaloalkane. It is to be noted that in all of the prior art examples the saturated halide (as a haloalkane) contained at least two halogen atoms combined with a single carbon atom. It is to be emphasized, too, that it was found by the prior art workers, and verified by myself, that even such polyhalides (that is, chloroform and carbon tetrachloride) can not be condensed with a monoolefin (that is, a non-halogenated unsaturated compound) in th the presence of aluminum chloride. Thus it is seen that previous to my discovery, neither monohalo or polyhalo saturated hydrocarbons had been condensed with olefinic hydrocarbons.

The polyhalogenated saturated hydrocarbons used in the prior art undergo little or no change when heated with aluminum chloride at the condensation conditions but in the absence of a haloolefin. Thus a prior art investigator refluxed chloroform and dichloroethylene separately with aluminum chloride and obtained little change in either reactant. He then mixed the chloroform and dichloroethylene and heated the mixture with aluminum chloride at 50° C. and effected condensation to pentachloropropane. It is important to note that chloroform itself did not react when heated with the aluminum chloride catalyst. In contrast with these results, if a monohaloparaffin such as that used in the process of my invention is contacted with aluminum chloride, even at room temperature, a vigorous reaction occurs, and hydrogen chloride is evolved.

Another important difference between the process of my invention and the prior art is the fact that my process can be carried out in the presence of many catalysts of the Friedel-Crafts type ranging in activities from such feebly active substances as mercuric chloride and moderately active substances as bismuth chloride to very active catalysts such as ferric chloride and aluminum chloride, whereas the prior art shows that only aluminum chloride can be used as catalyst for the condensation of a polyhaloalkane with a haloolefin; attempts by the earlier workers as well as by the present applicant have shown that even ferric chloride can not be used in place of aluminum chloride in the condensation of a polyhaloalkane and a haloolefin.

A further statement concerning the prior art on the condensation of a haloalkane and a monoolefin or haloolefin was given by C. A. Thomas ("Anhydrous Aluminum Chloride in Organic Chemistry," Reinhold Publishing Corporation, 1941, page 777) as follows:

"The addition of chlorinated paraffins to olefinic chlorides in the presence of aluminum chloride is not of general applicability. (H. J. Prins, Rec. trav. chim. 51, 1065–1080 (1932); Chemical Abstracts 27, 489.) Mono- and dichloromethane have been found to give no reaction. With the olefins, the reaction velocity was found to increase from tetrachloro- to monochloroethylene. Ethylene, itself, however, did not enter into the reaction, even with highly activated chloro-compounds. Certain chloroethanes can also add to chloroethylenes, the reaction velocity, however, being slower than that with the chloromethanes. Chloropropanes do not react with chloroethylenes, except pentachloropropane."

The foregoing statement of Thomas thus shows that even more than 25 years after the original discovery of the Prins reaction, it was not known that alkyl halides containing at least three carbon atoms could be condensed with olefins.

My process also differs from that of another reference of the prior art which discloses the condensation of a monohaloalkane with poly olefinic substance which must contain at least two double bonds per molecule.

The present process for reacting a monolefin and a monohaloalkane having at least 3 carbon atoms per molecule in which the halogen has an atomic weight of at least 35 apparently involves the addition of the monoholalkane to the double bond of the monolefinic hydrocarbon so as to produce another monohaloalkane of higher molecular weight. For example, the condensation of 1-chloro-2-methyl-propane with ethylene produces 1-chloro-3,3-dimethylbutane which is a primary hexyl chloride, as illustrated by the following equation:

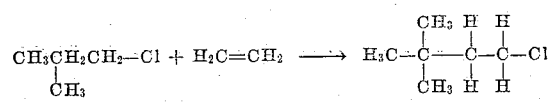

n-Propyl chloride and n-butyl chloride each react with two molecules of ethylene to yield 1-chloro-3,3-dimethylpentane and 1-chloro-3-methyl-3-ethylpentane, respectively.

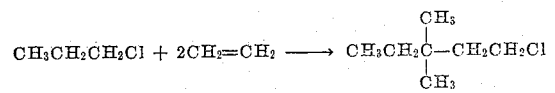

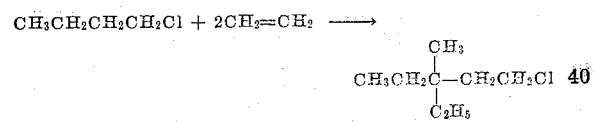

The condensation of a secondary monohaloalkane with a monoolefin is illustrated by the interaction of 2-chlorobutane with ethylene to produce 1-chloro-3-methylpentane as illustrated by the following equation:

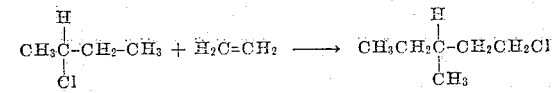

At the reaction conditions, the hexyl chloride thus formed may react with a second molecule of ethylene to yield 1-chloro-3-methyl-3-ethylpentane which is usually obtained as the chief product of the reaction of 2-chlorobutane with ethylene:

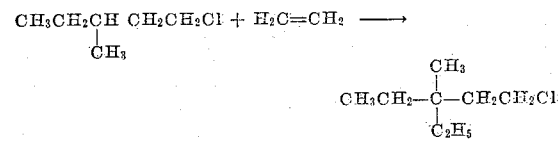

2-Halobutanes undergo similar condensations with propylene and with butylenes producing haloheptanes and haloöctanes, respectively, as the primary products. In some cases, the product thus formed is more reactive than is the original 2-halobutane and may react with a second and then a third, etc., molecule of the olefin.

The addition of tertiary butyl chloride, which may also be referred to as 2-chloro-2-methylpropane, to ethylene produces 1-chloro-3,3-dimethylbutane which is also a chloroneohexane. This condensation reaction to produce chloroneohexane is illustrated by the following equation:

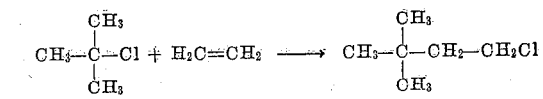

The 1-chloro-3,3-dimethylbutane is the principal product of this condensation reaction and no isomeric chlorohexanes are observed in the reaction products. A by-product of this reaction, particularly when using ferric chloride catalyst, is 1-chloro-3,3-dimethylpentane.

A similar reaction between tertiary amyl chloride and ethylene in the presence of aluminum chloride at about −5° C. yielded 25% of 1-chloro-3,3-di-methylpentane, and 12% of 1-chloro-3,3-dimethylbutane.

2-chloro-2-methylpropane underwent similar condensations with propylene and with n-butylenes to produce chloro-heptane and chloro-octance, respectively. Similarly, as illustrated by the following equation, a bromoheptane was obtainable by the reaction of 2-bromo-2-methylpropane with propylene.

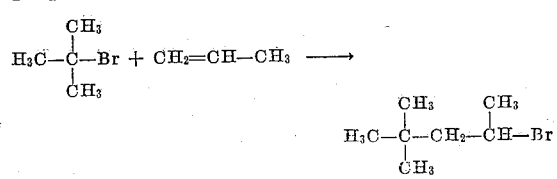

The condensations of different monohaloalkanes with different olefins are not necessarily effected with equal efficiencies or under the same conditions of operation. Further, the reaction temperature depends also on the catalyst used. Thus in the presence of an aluminum chloride catalyst, a temperature of from about −30° to about 10° C. is utilized generally when condensing a monohaloalkane with a primary or secondary monoolefin. When employing a less active catalyst such as bismuth chloride, a temperature of from about 0° C. to about 50° C. is preferable for condensing a tertiary alkyl chloride, bromide, or iodide, with an olefin containing at least three carbon atoms per molecule while a temperature of from about 25° to about 100° C. is employed in condensing these olefins with primary and secondary monohaloalkanes and a temperature of about 50° to about 125° C. is suitable for similar reaction between tertiary butyl chloride and ethylene. A temperature of from about 0° C. to about 50° C. is suitable for condensing ethylene, propylene, butylenes, and higher olefins with alkyl chlorides and bromides such as n-propyl chloride, isopropyl chloride, isobutyl chloride, tertiary butyl bromide, etc., in the presence of ferric chloride or zirconium chloride. Other Friedel-Crafts type metal halides also require rather narrow ranges of temperature for catalyzing the production of high yields of higher boiling haloalkanes in which the halogen has an atomic weight of at least 35.

The reaction of a monohaloalkane with a monoolefin in the presence of a catalyst is carried out using either batch or continuous operation. A hydrogen halide as hydrogen chloride, hydrogen bromide, or hydrogen iodide may also be introduced with the olefin and monohaloalkane charged. In batch type operations, desired proportions of lower boiling monohaloalkane and olefin or of monohaloalkane and a hydrocarbon fraction containing monoolefinic hydrocarbons, are introduced to a suitable reactor containing the Friedel-Crafts type catalyst as such or composited with a carrier or in solution in a suitable solvent, and the resultant commingled materials are contacted until substantial proportions of the reactants are converted into the desired higher molecular weight haloalkanes. The reaction mixture, after separation from the catalyst is fractionated to separate the unconverted monoolefinic hydrocarbon fraction and the unconverted monohaloalkane from the higher boiling monohaloalkane produced. The recovered monoolefinic hydrocarbon fraction and lower boiling monohaloalkane may be used in another run.

Continuous operations may be carried out by directing a mixture of a monoolefinic hydrocarbon and a monohaloalkane through a reactor of suitable design containing a bed of catalyst of the Friedel-Crafts type. In this type of treatment, the operating conditions may be adjusted suitably, and these may differ somewhat from those used in batch type operations. Thus, when a mixture of a monohaloalkane and an olefin was passed, for example, through a tube containing ferric chloride supported by granular porcelain, the formation of the desired higher boiling monohaloalkane was effected by using a higher temperature and shorter time of contact than those used when contacting a similar reaction mixture and catalyst at a lower temperature and in a batch type reactor, such as an autoclave provided with suitable stirring means.

By the process of this invention, I have prepared a number of novel secondary monohalooctanes (also called secondary octyl halides) containing a quaternary carbon atom. Thus the condensation of tertiary butyl chloride and 1-butylene produced 3-chloro-5,5-dimethylhexane, while the condensation of tertiary butyl chloride and 2-butylene yielded 2-chloro-3,4,4-trimethylpentane. I have also condensed tertiary amyl chloride and 2-butylene to produce 2-chloro-3,4,4-trimethylhexane. Reaction of tertiary amyl bromide with 2-butylene by my process has similarly yielded 2-bromo-3,4,4-trimethylhexane which is a mono-bromononane containing a quaternary carbon atom.

The products of my process, namely, the different higher boiling monohaloalkanes such as monochlorohexanes, -heptanes, -octanes, and other monohalohydrocarbons may be used for various purposes. For example, they may be converted into hydrocarbons of high antiknock value, or they may be utilized as solvents or as intermediates in organic syntheses. This process thus serves as a means for transforming normally gaseous monoolefins such as ethylene, propylene, and the n-butylenes, as well as relatively low boiling normally liquid primary and secondary olefins, such as various isomeric pentenes, hexenes, etc., into monohaloalkanes of higher molecular weight, the latter being then convertible into olefinic or paraffinic hydrocarbons with highly branched chain structures and utilizable in the production of aviation gasoline. The reaction of the various types of alkyl halides with ethylene has the further advantage that it yields higher molecular weight primary halides which are of particular value and desirability for certain processes; e. g. conversion to nitriles and to alkylsulfonates by reaction with metal cyanides and metal sulfites, respectively.

The following examples are given to illustrate the character of the results obtained by the use of the specific embodiment of the present process, although the data presented are not introduced with the intention of restricting unduly the generally broad scope of the invention.

EXAMPLE I 12 grams of ethylene was passed into a stirred mixture of 75 grams of normal propyl chloride and 6 grams of anhydrous aluminum chloride during a period of 1.5 hours while the reaction mixture was maintained at a temperature of from 2° to 6° C. and at atmospheric pressure. The reaction product so obtained consisted of about 1 gram of catalyst layer and 83 grams of liquid product containing about 6 grams of catalyst in solution. Investigation of the liquid product showed that a 25% yield of 1-chloro-3,3-dimethylpentane was obtained based upon the ethylene which reacted.

EXAMPLE II 10 grams of ethylene was added with stirring during a period of 1 hour to a mixture of 50 grams of isobutyl chloride, 50 grams of n-pentane diluent, and 5 grams of aluminum chloride maintained at a temperature between −25° and −10° C. The reaction product so obtained consisted of 11 grams of catalyst layer, 1 gram of hydrogen chloride, and 103 grams of a liquid product. 1-chloro-3,3-dimethylbutane was present in the liquid product in an amount equivalent to 40% of the theoretical yield based upon the isobutyl chloride charged or in about a 60% yield based upon the ethylene absorbed in the reaction.

EXAMPLE III 20 grams of ethylene was added with stirring during a period of 0.5 hour to a reaction mixture containing 51 grams of n-butyl chloride, 50 grams of pentane diluent, and 10 grams of anhydrous aluminum chloride maintained at a temperature of from −20° to 0° C. The reaction product consisted of 16 grams of catalyst, 1 gram of hydrogen chloride, and 114 grams of liquid product. This liquid product contained 1-chloro-3-methyl-3-ethylpentane in amount equivalent to 15% of the theoretical yield, based upon the n-butyl chloride which reacted.

EXAMPLE IV 70 grams of isobutyl chloride and 43 grams of propylene were reacted in the presence of 4 grams of bismuth chloride at 50° C. during a period of 4 hours. The reaction product consisted of 4 grams of catalyst, 77 grams of liquid product, and 28 grams of unconverted propylene and isobutyl chloride. The liquid product contained 8 grams of chloroheptane boiling at 128–138° C. and consisting of a mixture of 2-chloro-4,4-dimethylpentane and 2- and/or 3-chloro-2,3-dimethylpentane.

EXAMPLE V 16 grams of ethylene was introduced with stirring at atmospheric pressure during a period of 0.6 hour to a reactor containing 50 grams of isopropyl chloride, 50 grams of n-pentane diluent, and 5 grams of anhydrous aluminum chloride maintained at a temperature of from −18° to −14° C. The reaction product consisted of 6 grams of a catalyst layer and 115 grams of liquid product. The liquid product contained 20 grams of 1-chloro-3,3-dimethylpentane boiling mainly at 148–149° C. and having an index of refraction, $n_D^{20}$, of 1.4261. The recovered liquid product also contained 100 cc. of a mixture of isopropyl chloride and pentane and 8 grams of liquid boiling higher than 1-chloro-3,3-dimethylpentane.

EXAMPLE VI 58 grams of isopropyl chloride and 5 grams of ferric chloride were placed in a glass-lined autoclave to which ethylene was charged to 40 atmospheres pressure after which the charged autoclave was rotated for 4 hours at 24° C. and then allowed to stand for 16 hours after which time the pressure reached 28 atmospheres. After releasing the excess of ethylene, a reaction product was removed from the autoclave consisting of 62 grams of liquid and 5 grams of catalyst, each brown in color. The liquid product was separated by distillation into the following fractions: 78% by volume boiling below 40° C. and consisting essentially of unconverted isopropyl chloride, 1% by volume boiling between 100° and 125° C., 14% boiling between 125° and 150° C. and 6% of higher boiling material. The fraction boiling between 125° and 150° C. contained 8 grams of 1-chloro-3,3-dimethylpentane, an amount equivalent to an 8% yield based upon the isopropyl chloride charged or 20% based on the isopropyl chloride which reacted.

EXAMPLE VII

The autoclave used in Example VI was charged similarly with 40 grams of isopropyl chloride, and 10 grams of bismuth chloride. Ethylene was then introduced to an initial pressure of 40 atmospheres and the autoclave was rotated while its temperature was increased and maintained at 100° C. for a period of 4 hours. After the autoclave had cooled to room temperature, the final pressure of the reaction mixture was 27 atmospheres. The reaction mixture which was obtained consisted of 37 grams of liquid product, 14 grams of a reddish-brown tar containing the catalyst and 5 grams of gaseous products condensable at −78° C. Besides containing 27 grams of isopropyl chloride, the recovered liquid product consisted of 4 cc. boiling between 40° and 100° C., 5 cc. boiling from 100° to 125° C., 12 cc. boiling between 125° and 150° C., and 15 cc. of higher boiling liquids. The yield of 1-chloro-3,3-dimethylpentane was 18% of the theoretical based on the unrecovered isopropyl chloride.

EXAMPLE VIII 26 grams of ethylene was introduced at atmospheric pressure during 0.5 hour to a stirred reaction mixture consisting of 50 grams of secondary butyl chloride, 50 grams of n-pentane diluent, and 5 grams of aluminum chloride maintained at a temperature of from −16° to −10° C. The reaction product obtained consisted of 123 grams of liquid product and 8 grams of catalyst. The liquid product contained 28 grams of octyl chlorides consisting essentially of 1-chloro-3-methyl-3-ethylpentane. The yield of octyl chloride was 35% of the theoretical based on the secondary butyl chloride charged.

EXAMPLE IX

Using the same method of procedure as described in Example VIII, ethylene was passed at atmospheric pressure during a period of 1.8 hours into a stirred mixture of 100 grams of secondary butyl bromide, 53 grams of n-pentane diluent, and 8 grams of aluminium chloride, the temperature of the reaction mixture being maintained between −22° and −18° C. by a cooling bath surrounding the reactor. During the reaction, there was a 51 gram increase in weight of the reaction mixture due to the ethylene reacting and dissolving therein. The reaction product obtained consisted of 26 grams of a yellow catalyst sludge and 186 grams of liquid, the latter being then washed, dried, and distilled. Distillation of the dried liquid products separated therefrom 45 grams of bromo-octane boiling chiefly at 40–42° C. at a pressure of 3 mm. of mercury having an index of refraction, $n_D^{20}$, of 1.456, and a specific gravity, $d_4^{20}$, of 1.11. The bromo-octane was identified as chiefly 1-bromo-3-methyl-3-ethylpentane.

EXAMPLE X 120 grams of tertiary butyl chloride and 17 grams of bismuth chloride were placed in a glass liner which was then enclosed in a rotatable autoclave to which ethylene was added to a pressure of 40 atmospheres. The temperature of the autoclave was then raised and maintained at the operating temperature of 90° C. and the autoclave was rotated for 4 hours. The pressure reached a maximum of 48 atmospheres, decreased to 38 atmospheres at the end of 1 hour, and reached a final pressure of 5 atmospheres after the autoclave cooled to room temperature. The reaction products removed from the autoclave consisted of 131 grams of colorless liquid and 22 grams of a reddish-brown catalyst sludge or tar. The liquid product was washed with caustic and water, then dried and fractionally distilled beginning at ordinary pressure, and gradually reducing the pressure as the boiling point of the product increased. The different fractions so obtained had the properties shown in Table 1.

*Table 1.—Distillation of products formed by condensation of tertiary butyl chloride with ethylene in the presence of bismuth chloride*

| Fraction, No. | B. P., °C. | Pressure, mm. | B. P., °C. at 760 mm. | Vol., cc. | $n_D^{20}$ |
|---|---|---|---|---|---|
| 1 | 50–50 | 740 | 50–50 | 15.7 | 1.3846 |
| 2 | 33–33 | 400 | 50–51 | 9.7 | 1.3858 |
| 3 | 16–24 | 200 | 51–60 | 6.3 | 1.3851 |
| 4 | 24–72 | 200 | 60–115 | 5.3 | 1.4048 |
| 5 | 57–57 | 100 | 115–116 | 26.7 | 1.4160 |
| 6 | 43–38 | 50–40 | 116–118 | 7.0 | 1.4160 |
| 7 | 26–42 | 8 | 118–134 | 10.1 | 1.4312 |
| Residue | | | | 23.7 | 1.4457 |

Fractions 1–3, inclusive, consisted mainly of unconverted tertiary butyl chloride and fraction 4 was an intermediate fraction. Fraction 5, which on redistillation boiled at 116–117° C. at 740 mm. pressure had a density of 0.8670 at 20° C. and a molecular weight of 113 as determined cyroscopically. This molecular weight thus corresponded to that of a hexyl chloride. By means of a Grignard reagent the hexyl chloride was converted into the corresponding alcohol, and the latter yielded an alpha-naphthylurethan melting at 81–82° C., a 3,5-dinitro-benzoate melting at 81–82° C., and an alpha-naphthylamine addition compound of the dinitrobenzoate melting at 132–133° C. These derivatives prove that the alcohol was 3,3-dimethyl butanol-1 and accordingly that the chloro compound was 1-chloro-3,3-dimethylbutane, that is a chloroneohexane. The compound 1-bromo-3,3-dimethyl butane was obtained similarly from the condensation of tertiary butyl bromide with ethylene. Each of these halogenated neohexanes may be referred to as a 1-halo-3,3-dimethyl butane.

The residue indicated in Table 1 apparently contained higher boiling haloalkanes probably formed by condensation of chloroneohexane with ethylene.

EXAMPLE XI

In another run, carried out similarly to that described in Example X, 54 grams of tertiary butyl chloride and 5 grams of anhydrous ferric chloride were charged to the autoclave to which ethylene was then added to 40 atmospheres pressure. While the autoclave was then rotated at room temperature, the pressure dropped to 30 atmospheres at the end of two hours. After the autoclave had been rotated for 4 hours, the rotating was stopped and the autoclave was allowed to stand at room temperature for 67 hours, at the end of which time the pressure was 18 atmospheres. From the reaction product was separated 67 grams of a reddish-brown liquid and 8 grams of catalyst in the form of brown lumps. The liquid product was washed with water, dried, and distilled into the fractions shown in Table 2.

*Table 2.—Distillation of product formed by condensation of tertiary butyl chloride with ethylene in the presence of ferric chloride*

| Fraction No. | B. P., °C. | Volume, cc. | $n_D^{20}$ |
|---|---|---|---|
| 1 | 70–115 | 3 | 1.4070 |
| 2 | 115–119 | 45 | 1.4160 |
| 3 | 119–155 | 7 | 1.4188 |
| 4 | 155–195 | 5 | 1.4351 |
| Residue | | 4 | |

Fraction 2 consisted of 1-chloro-3,3-dimethylbutane which was identified as mentioned in Example X.

EXAMPLE XII

This run was carried out in a manenr similar to that shown in Example X except that 75 grams of liquefied propylene was weighed into a glass autoclave-liner, previously cooled to −78° C. and containing 140 grams of tertiary butyl chloride and 10 grams of bismuth chloride. After the autoclave-liner containing the reaction mixture was placed in the autoclave, the latter was closed, and nitrogen was added to a total pressure of 50 atmospheres. The charged autoclave was then rotated at 20° C. for 4 hours after which the rotation was stopped and the autoclave allowed to stand at 20° C. for 16 hours. The resultant reaction product consisted of 35 grams of unconverted propylene, 173 grams of liquid containing some dissolved propylene, and 12 grams of catalyst in the form of white lumps. After washing and drying, the total of 165 cc. of liquid product was distilled into the fractions shown in Table 3.

*Table 3.—Distillation of product formed by condensation of tertiary butyl chloride with propylene in the presence of bismuth chloride*

| Fraction No. | B. P., °C. | Pressure, mm. | B. P., °C. at 760 mm. | Vol., cc. | $n_D^{20}$ |
|---|---|---|---|---|---|
| 1 | 45–50 | 737 | 45–50 | 33.1 | 1.3835 |
| 2 | 50–50 | 737 | 50–50 | 34.4 | 1.3848 |
| 3 | 29–29 | 340 | 50–50 | 12.6 | 1.3850 |
| 4 | 66–73 | 100 | 124–131 | 28.0 | 1.4190 |
| 5 | 73–76 | 100 | 131–134 | 37.4 | 1.4252 |
| 6 | 65–59 | 57–17 | 134–163 | 7.6 | 1.4318 |
| 7 | 64–62 | 7–4 | 163–200 | 0.4 | 1.4338 |
| Residue | | | | 8.0 | 1.4490 |

Fraction 5 had a density of 0.8691 at 20° C. and a molecular weight of 129 as determined cryoscopically in benzene. A portion of fraction 5 was converted into the corresponding alcohol which yielded a 3,5-dinitrobenzoate melting at 94.5–95.5° C. and an alpha naphthylurethan melting at 86–87° C. thus proving that fraction 5 was 2-chloro-4,4-dimethylpentane.

EXAMPLE XIII

Zirconium chloride was also employed as catalyst for the condensation of tertiary butyl chloride with propylene under the same conditions as shown in Example XII, employing a reaction mixture of 50 grams of tertiary butyl chloride, 21 grams of propylene, and 10 grams of zirconium chloride. The reaction product yielded approximately 10 grams of chloroheptane boiling between 127° and 136° C.

EXAMPLE XIV 148 grams of tertiary butyl chloride, 68 grams of normal butylenes (consisting of about 95% of 2-butylenes and about 5% of 1-butylenes) and 13 grams of bismuth chloride was placed in a glass-lined autoclave which was rotated at room temperature for 4 hours. The resultant reaction products were separated into 220 grams of colorless liquid and 14 grams of used catalyst. Distillation of the colorless liquid, after removal of unreacted propylene and t-butyl chloride, gave the fractions shown in Table 4.

*Table 4.—Distillation of product formed by condensation of tertiary butyl chloride with n-butylenes in the presence of bismuth chloride*

| Fraction No. | B. P., °C. | Pressure, mm. | B. P., °C. at 760 mm. | Vol., cc. | $n_D^{20}$ |
|---|---|---|---|---|---|
| 1 | 34–26 | 400–210 | 53–58 | 21.8 | 1.3885 |
| 2 | 26–17 | 210–122 | 58–64 | 6.8 | 1.3921 |
| 3 | 24–26 | 80–23 | 83–118 | 8.5 | 1.4184 |
| 4 | 26–28 | 23–23 | 118–122 | 3.4 | 1.4230 |
| 5 | 28–21 | 23–11 | 122–125 | 8.5 | 1.4237 |
| 6 | 39–43 | 11–11 | 151–157 | 4.6 | 1.4289 |
| 7 | 43–43 | 11–11 | 157–157 | 8.2 | 1.4367 |
| 8 | 43–43 | 11–11 | 157–157 | 12.7 | 1.4396 |
| Residue | | | | 7 | 1.4449 |

Fractions 1 and 2 were essentially unconverted tertiary butyl chloride while fractions 3, 4 and 5 consisted of octenes apparently resulting from dehydrochlorination of chloro-octane. Fractions 6 to 8, inclusive, which boiled mainly at 157° C., at 760 mm. pressure, consisted of chloro-octane.

EXAMPLE XV 72 grams of tertiary butyl bromide, 32 grams of propylene, 0.1 gram of ascaridole, and 3 grams of bismuth chloride were placed in an autoclave to which nitrogen was added to a pressure of 50 atmospheres after which the autoclave was rotated for 4 hours at 25° C. The autoclave and contents then stood for 16 hours. The reaction products removed from the autoclave consisted of 98 grams of pale yellow liquid free from hydrogen bromide and 5 grams of used catalyst, the latter being orange in color. During the reaction the propylene underwent complete conversion. The pale yellow liquid was dissolved in pentane to facilitate washing with caustic and water after which the pentane solution was dried and fractionally distilled to give (after removal of pentane) 12 grams of unconverted tertiary butyl bromide boiling at 79° C., and 46 grams of heptyl bromide boiling at 145° to 148° C.; higher boiling materials remaining after the distillation totaled 22 grams.

EXAMPLE XVI

In a number of runs, ethylene was passed at atmospheric pressure into a stirred mixture of a monohaloalkane, aluminum chloride, and in some instances, n-pentane, the latter employed as a solvent or diluent. These runs were carried out in a 3-necked flask equipped with an inlet tube for ethylene, a mercury-sealed stirrer, and a reflux condenser. The monohaloalkane and n-pentane, when the latter was used, were placed in the flask and then cooled to about −60° C. by immersion in a cooling bath. The catalyst was added, the cooling bath was removed from around the reaction flask, and ethylene was passed into the well-stirred mixture by means of a tube, dipping below the surface of the reaction mixture. The temperature of the reaction mixture was permitted to rise until absorption of ethylene began, this being determined by a difference in the rates of bubbling through inlet and exit bubblers. The reaction temperature was then maintained at about that needed for ethylene absorption either until the desired amount of ethylene was absorbed as indicated by increase in weight, or until absorption of ethylene ceased. The reaction mixture was then cooled to about −40° C., the liquid was decanted from the catalyst and the liquid was washed, dried, and distilled at reduced pressure.

By using this procedure, ethylene, and the monohaloalkanes listed in Table 5 were condensed in the presence of the catalysts and at the temperatures also shown in the table.

The above indicated condensation involving tertiary butyl chloride and ethylene yielded 1-chloro-3,3-dimethylbutane as the principal product. The similar condensation of tertiary amyl chloride and ethylene, and of tertiary amyl bromide and ethylene in the presence of aluminum chloride yielded, respectively, 1-chloro-, and 1-bromo-3,3-dimethylpentanes. The condensation reaction between tertiary amyl bromide and ethylene also gave a nonyl bromide in substantial yield. 1-chloro-3,3-dimethylbutane was a by-product of the reaction of t-amyl chloride with ethylene.

EXAMPLE XVII

Other runs were made using essentially the apparatus and procedure employed in Examples X to XV, inclusive. A monohaloalkane was weighed into an autoclave liner made of glass, the liner and monohaloalkane were cooled to −78° C., the catalyst was added thereto, and the liner was sealed into a rotatable steel autoclave of 850 cc. capacity. The sealed autoclave was then charged with ethylene to about 40–50 atmospheres pressure. The autoclave was rotated at the desired temperature for 4 hours, more ethylene was added if the pressure fell below 25 atmospheres, the autoclave was allowed to stand overnight, then opened, and the product worked up as described in the preceding example.

In these runs, the monohaloalkanes listed in Table 6 were condensed with ethylene in the presence of the catalysts and at the temperatures shown in the table. In these runs, no attempt was made to determine the amount of ethylene which reacted.

*Table 6.—Condensation of tertiary butyl and tertiary amyl halides with ethylene at superatmospheric pressure in the presence of a Friedel-Crafts type metal halide*

| Run No. | Alkyl Halide | | MX | grams | Temp., °C. | Main Product | | |
|---|---|---|---|---|---|---|---|---|
| | RX | grams | | | | R'X | Yield | |
| | | | | | | | grams | Percent of RX Charged |
| 10 | t-$C_4H_9Cl$ | 50 | $BiCl_3$ | 10 | 50 | 1-chloro-3,3-dimethyl-butane | 4 | 6 |
| 11 | do | 50 | do | 10 | 100 | | 20 | 30 |
| 12 | do | 50 | $ZnCl_2$ | 5 | 100 | | 9 | 14 |
| 13 | t-$C_4H_9Br$ | 80 | $FeCl_3$ | 8 | 30 | 1-bromo-3,3-dimethylbutane | 27 | 28 |
| 14 | do | 88 | $BiCl_3$ | 4 | 70 | | 24 | 23 |
| 15 | t-$C_5H_{11}Br$ | 100 | $FeCl_3$ | 8 | 40 | 1-bromo-3,3-dimethylpentane | 30 | 25 |
| 16 | do | 100 | $BiCl_3$ | 10 | 50 | | 14 | 12 |

The above-described reactions of tertiary butyl chloride with ethylene yielded 1-chloro-3,3-di-

*Table 5.—Condensation of ethylene with tertiary alkyl halides at atmospheric pressure in the presence of aluminum chloride*

| Run No. | Alkyl halide, RX | | $C_2H_4$, grams | $AlCl_3$, grams | Temp., °C. | Main Product | | |
|---|---|---|---|---|---|---|---|---|
| | RX | Grams | | | | R'X | Yield | |
| | | | | | | | Grams | Percent of RX charged |
| 7 | tert-$C_4H_9Cl$ | [1] 50 | 20 | 3 | −15 to −10 | 1-chloro-3,3-dimethylbutane | 49 | 75 |
| 8 | tert-$C_5H_{11}Cl$ | 150 | 18 | 15 | −10 to −2 | 1-chloro-3,3-dimethylpentane | [2] 48 | 25 |
| 9 | tert-$C_5H_{11}Br$ | [1] 102 | 35 | 3 | −23 to −17 | 1-bromo-3,3-dimethylpentene [3] | 48 | 40 |
| | | | | | | $C_9H_{19}Br$ [4] | 30 | 20 |

[1] Also n-pentane (50 g.) was used as diluent.
[2] There was also obtained as by-product, 20 g. (12% of the theoretical yield based on the amyl chloride charged) of 1-chloro-3,3-dimethylbutane.
[3] Boiling point, 51–52° C., at 10 mm. or 167–168° C. at 760 mm. pressure; $n_D^{20}$, 1.4546; $d_4^{20}$, 1.1497.
[4] Boiling point, 60–61° C. at 3 mm. or 205–206° C. at 760 mm. pressure; $n_D^{20}$, 1.4630; $d_4^{20}$, 1.0950.

methylbutane as the principal product. No evidence of the formation of isomeric chlorohexanes was obtained. A by-product of the reaction, particularly when it was catalyzed by ferric chloride, was 1-chloro-3,3-dimethylpentane.

The similar condensation involving tertiary amyl bromide and ethylene in the presence of ferric chloride and bismuth trichloride yielded the bromoheptane, 1-bromo-3,3-dimethylpentane.

EXAMPLE XVIII

A large scale run was made at superatmospheric pressure in an autoclave equipped with a very efficient stirrer, this equipment being generally referred to as a "turbomixer." 34 grams of anhydrous ferric chloride was placed in the turbomixer which was then sealed, cooled to −78° C., and evacuated. To the evacuated turbomixer containing the ferric chloride, 680 grams of tertiary butyl chloride was introduced, operation of the stirrer was started, ethylene was added to a pressure of 27 atmospheres, and the temperature was permitted to rise to −10° C. at which rapid absorption of ethylene occurred. Within 1 minute after the reaction began, the pressure had decreased to 1 atmosphere and the temperature reached 8° C. The cooling bath was again placed around the turbomixer and ethylene was recharged thereto to 1.7 atmospheres. Reaction was rapid and the pressure decreased to 1 atmosphere within 1 minute. The turbomixer was thus recharged intermittently with ethylene over a period of 1 hour during which the reaction temperature was maintained between −5° and +5° C. At the end of this time, absorption of ethylene was slow, even when the ethylene pressure was increased to 7.8 atmospheres. Then the stirring was stopped and 810 grams of liquid product was discharged from the turbomixer. The used catalyst was a brown solid wetted with liquid product. The liquid product which was recovered from the turbomixer after washing, drying, and distilling, yielded 490 grams of 1-chloro-3,3-dimethylbutane and 30 grams of 1-chloro-3,3-dimethylpentane, these amounts representing yields of 55 and 6% respectively, based upon the amount of tertiary butyl chloride charged.

EXAMPLE XIX

An autoclave as described in Examples X to XV was charged with 50 grams of tertiary butyl chloride, 25 grams of propylene and 7 grams of titanium tetrachloride. Nitrogen was then introduced to the autoclave to a pressure of 50 atmospheres and the autoclave was rotated and heated at 50 C. for a period of 4 hours. After the autoclave and contents had cooled to room temperature, 72 grams of a liquid product and 6 grams of brown catalyst sludge were removed therefrom. Distillation of the liquid product removed therefrom 21 g. of a chloroheptane boiling between 138 and 146° C. and having a refractive index of 1.428. In addition to the chloroheptane, some higher boiling products also resulted. The titanium tetrachloride catalyst employed was soluble in the liquid reactants but during the reaction it was converted into a brown sludge.

EXAMPLE XX

Several runs were made in which tertiary butyl chloride was condensed with 1-butylene and 2-butylene in the presence of ferric chloride or bismuth trichloride. The operating temperatures used, the amounts of the different reactants, and the results obtained are summarized in Table 7.

*Table 7.—Condensation of tertiary butyl chloride with 1-butylene and 2-butylene in the presence of ferric chloride and bismuth chloride*

| Run No. | t-Bu Cl, grams | $C_nH_{2n}$ | $C_nH_{2n}$, grams | Catalyst | grams | Temp., ° C. | Main Product, $C_8H_{17}Cl$ grams | Per Cent Yield |
|---|---|---|---|---|---|---|---|---|
| 17 | 84 | 1−$C_4H_8$ | 48 | $FeCl_3$ | 4 | −20 to −10 | 50 | 39 |
| 18 | 668 | 2−$C_4H_8$ | 405 | ...do... | 11 | −35 to −10 | 453 | 42 |
| 19 | 150 | 2−$C_4H_8$ | 76 | ...do... | 5 | −30 | 130 | 65 |
| 20 | 439 | 1−$C_4H_8$ | 242 | $BiCl_3$ | 51 | +20 | 220 | [1] 35 |
| 21 | 90 | 2−$C_4H_8$ | 45 | ...do... | 18 | +25 | 28 | 24 |

[1] At least 80% of the theoretical based on the converted t-butyl chloride.

Runs Nos. 17 and 18 were carried out in a cylindrical glass reactor at atmospheric pressure. Run No. 19 was made using the procedure of Example XVI, while run Nos. 20 and 21 were carried out following the procedure of Example XII.

In run 19, the condensation was carried out in a solvent, that is 50 grams of n-pentane was also present in the reaction mixture. In this run, a 65% yield of 2-chloro-3,4,4-trimethylpentane was obtained by passing the 2-butylene into a well-stirred mixture of tertiary butyl chloride, n-pentane, and ferric chloride at −30° C. and at atmospheric pressure. In another run made in the presence of bismuth trichloride as catalyst, little or no condensation occurred at 10° C. but a 24% yield of the desired chloro-octane was obtained as shown in Table 7 when the reaction was carried out in a rotating autoclave at 25° C.

The chloro-octane obtained by the condensation of tertiary butyl chloride with 1-butylene consisted of 3-chloro-5,5-dimethylhexane; that obtained by the reaction of tertiary butyl chloride with 2-butylene consisted largely of 2-chloro-3,4,4-trimethylpentane. The physical properties of these chlorooctanes are listed in Table 8.

Table 8.—Physical properties of the chloro-octanes obtained by the reaction of t-butyl chloride with 1-butylene and 2-butylene

| From t-butyl chloride and | 1-Butylene | | 2-Butylene | |
|---|---|---|---|---|
| Run No | 17 | 20 | 18 | 21 |
| Catalyst | FeCl$_3$ | BiCl$_3$ | FeCl$_3$ | BiCl$_3$ |
| Boiling Point, °C. at 760 mm | 154–156 | 153–156 | 160–160 | 158–160 |
| Refractive Index, $n_D^{20}$ | 1.4284 | 1.4300 | 1.4435 | 1.4430 |
| Density, $d_4^{20}$ | 0.8699 | | | 0.9031 |
| Molecular Refraction (Calcd. for C$_8$H$_{17}$Cl, 43.85) | 43.99 | | | 43.62 |

EXAMPLE XXI

A mixture of tertiary butyl bromide and 2-butylene cooled to +10° C. in a glass flask equipped with a stirrer reacted very vigorously when about 2% by weight of ferric chloride was added. The temperature of the reaction mixture increased to 23° C. in less than 1 minute after the starting of the reaction and 2-bromo-3,4,4-trimethylpentane was formed in a yield of about 50%, based upon the amount of tertiary butyl bromide converted. The bromo-trimethylpentane boiled at 56–57° C. at 7 mm. or 181–182° C. at 760 mm.; its melting point was about −30° C.; $n_D^{20}$, 1.468; $d_4^{20}$, 1.13.

EXAMPLE XXII

The condensation of tertiary amyl chloride with 2-butylene took place very slowly at 0° C. and at atmospheric pressure in the presence of ferric chloride. Condensation took place readily at 25° C. giving a 31% yield of the chlorononane, 2-chloro-3,4,4-trimethylhexane. The chlorononane had the following properties; boiling point, 72–75° C. at 16 mm. or 182–185° C. at 760 mm.; $n_D^{20}$, 1.448; $d_4^{20}$, 0.9019.

The corresponding bromononane was obtained in about a 10% yield by reacting tertiary amyl bromide and 2-butylene at 25° C. in the presence of a bismuth chloride catalyst. The bromononane boiled at 53–57° C. at 3 mm. pressure (193 to 197° C. at atmospheric pressure); $n_D^{20}$, 1.468.

EXAMPLE XXIII

A mixture of 110 grams of tertiary amyl chloride, 42 grams of propylene, and 5 grams of ferric chloride was placed in a rotatable steel autoclave and rotated therein at 25° C. for 4 hours after which the autoclave and contents stood at room temperature for about 15 hours. The reaction mixture so obtained consisted of 132 grams of a dark red liquid containing brown catalyst particles as well as 20 grams of unconverted propylene. The dark red liquid upon being washed, dried, and distilled yielded 15 g. of a chloro-octane boiling at 157–162° C.

EXAMPLE XXIV

The autoclave employed in Examples X to XV, inclusive, was charged with 38 grams of tertiary butyl iodide, 15 grams of propylene and 4 grams of ferric chloride, and then the contents of the autoclave were placed under a nitrogen pressure of 50 atmospheres. The autoclave was then rotated at 31° C. for 4 hours. The reaction product so obtained contained 22 grams of iodoheptane boiling at 60–66° C. at a pressure of 20–22 mm. of mercury. This iodoheptane was mainly 2-iodo-4,4-dimethylpentane.

EXAMPLE XXV

Several runs were made on the condensation of monohaloalkanes with monoolefins in the presence of solutions of a Friedel-Crafts type catalyst in a solvent such as a nitroparaffin or ether. With the bismuth chloride catalyst in nitromethane solution, condensation of tertiary butyl chloride and propylene took place at about 25° C., yielding chloroheptane together with some unsaturated products, possibly polymers of propylene or butylene.

A nitromethane solution of ferric chloride catalyzed the condensation of tertiary butyl chloride with ethylene at 23° C., yielding chlorohexane as the chief product.

The condensation of tertiary butyl chloride with propylene was catalyzed by bismuth chloride in ethyl ether solution at a reaction temperature of 60° C.

A good yield of chloroheptane was obtained when tertiary butyl chloride and propylene were treated with a solution of aluminum chloride in ethyl ether at 50° C. and at an initial nitrogen pressure of 50 atmospheres. The chloroheptane formed had a boiling point of 134–136° C.

The results obtained in the above-described runs using different solvents are summarized in Table 9.

Table 9.—Condensation of t-butyl chloride with mono-olefins in the presence of nitromethane, 2-nitropropane and ether

| Run No | 22 | 23 | 24 | 25 | 26 | 27 |
|---|---|---|---|---|---|---|
| Temp. °C | 24 | 23 | 50 | 60 | 50 | 30 |
| t-BuCl, grams | 71 | 59 | 51 | 50 | 101 | 100 |
| Olefin, grams: | | | | | | |
| C$_2$H$_4$ | | (1) | | | | (2) |
| C$_3$H$_6$ | 49 | | 22 | 20 | | |
| n-C$_4$H$_8$ | | | | | 62 | |
| Catalyst, grams: | | | | | | |
| BiCl$_3$ | 3 | | | 3 | | |
| FeCl$_3$ | | 5 | | | | |
| AlCl$_3$ | | | 5 | | 10 | 10 |
| Solvents, grams: | | | | | | |
| CH$_3$NO$_2$ | 21 | 20 | | | | |
| i-PrNO$_2$ | | | | | | 15 |
| Et$_2$O | | | 4 | 13 | 10 | |
| Chief Products, grams: | | | | | | |
| C$_6$H$_{13}$Cl | | 16 | | | | 35 |
| C$_7$H$_{15}$Cl | | | 23 | 8 | | |
| C$_8$H$_{17}$Cl | | | | | 48 | |

[1] Ethylene charged to 50–55 atm.
[2] Ethylene charged to 40 atm.

EXAMPLE XXVI

In a rotatable steel autoclave at about 25° C. and at 50 atmospheres pressure, t-butyl chloride reacted with propylene in the presence of anhydrous zinc chloride yielding chloroheptane in 20% yield based on the t-butyl chloride charged. At 50° C., a 30% yield of chloroheptane was obtained similarly in the presence of a catalyst consisting of 25% zinc chloride and 75% of alumina. The latter yield of chloroheptane was 60% based upon the t-butyl chloride which reacted.

The chloroheptane obtained in the presence of the alumina-containing catalyst seemed to have a wider boiling range than did the product obtained with pure zinc chloride.

EXAMPLE XXVII 160 grams of t-butyl chloride, 81 grams of propylene, 10 grams of bismuth chloride, and 10 grams of alumina powder were placed in a glass-lined steel autoclave and rotated at 25° C. for a time of four hours. 755 grams of liquid product obtained from three of such runs was washed, dried, and distilled. A total of 290 grams of chloroheptane was obtained consisting of two isomers, one boiling at 129-130° C. and the other at about 136-138° C.

EXAMPLE XXVIII 9 grams of heptyl bromide boiling from 148° to 153° C. was obtained by contacting 42 grams of t-butyl bromide, 21 grams of propylene, and 5 grams of mercuric chloride in a glass-lined rotating autoclave at 40° C., for 4 hours. Essentially the same result was obtained on treating a similar reaction mixture at 60° C.

The character of the invention and type of results obtained by its use are evident from the preceding specification and examples although neither section should be construed to impose undue limitations upon the broad scope of the invention.

I claim as my invention:

1. A process which comprises reacting a monohaloalkane having at least three carbon atoms per molecule and a halogen of at least 35 atomic weight with an aliphatic monoolefin in which at least one hydrogen atom is combined with each of the carbon atoms joined by the double bond in the presence of a Friedel-Crafts metal halide catalyst at a temperature such that the principal reaction of the process is the formation of a monohaloalkane having a molecular weight equal to the sum of the molecular weights of the reacting monohaloalkane and monoolefin.

2. A process which comprises reacting a monochloroalkane having at least three carbon atoms per molecule with an aliphatic monoolefin in which at least one hydrogen atom is combined with each of the carbon atoms joined by the double bond in the presence of a Friedel-Crafts metal halide catalyst and at a temperature such that the principal reaction of the process is the formation of a monochloroalkane having a molecular weight equal to the sum of the molecular weights of the reacting monochloroalkane and monoolefin.

3. A process which comprises reacting a monobromoalkane having at least three carbon atoms per molecule with an aliphatic monoolefin in which at least one hydrogen atom is combined with each of the carbon atoms joined by the double bond in the presence of a Friedel-Crafts metal halide catalyst at a temperature such that the principal reaction of the process is the formation of a monochloroalkane having a molecular weight equal to the sum of the molecular weights of the reacting monobromoalkane and monoolefin.

4. A process which comprises reacting a monoiodoalkane having at least three carbon atoms per molecule with an aliphatic monoolefin in which at least one hydrogen atom is combined with each of the carbon atoms joined by the double bond in the presence of a Friedel-Crafts metal halide catalyst at a temperature such that the principal reaction of the process is the formation of a monoiodoalkane having a molecular weight equal to the sum of the molecular weights of the reacting monoiodoalkane and monoolefin.

5. A process which comprises reacting a monochloroalkane having at least three carbon atoms per molecule with an aliphatic monoolefin in which at least one hydrogen atom is combined with each of the carbon atoms joined by the double bond in the presence of aluminum chloride at a temperature of from about —30° to about 10° C. such that the principal reaction of the process is the formation of a monochloroalkane having a molecular weight equal to the sum of the molecular weights of the reacting monochloroalkane and monoolefin.

6. A process which comprises reacting a monochloroalkane having at least three carbon atoms per molecule with an aliphatic monoolefin in which at least one hydrogen atom is combined with each of the carbon atoms joined by the double bond in the presence of ferric chloride at a temperature of from about 0° to about 50° C. such that the principal reaction of the process is the formation of a monochloroalkane having a molecular weight equal to the sum of the molecular weights of the reacting monochloroalkane and monoolefin.

7. A process which comprises reacting a monochloroalkane having at least three carbon atoms per molecule with an aliphatic monoolefin in which at least one hydrogen atom is combined with each of the carbon atoms joined by the double bond in the presence of bismuth trichloride at a temperature of from about 25° to about 100° C. such that the principal reaction of the process is the formation of a monochloroalkane having a molecular weight equal to the sum of the molecular weights of the reacting monochloroalkane and monoolefin.

8. The process of claim 1 further characterized in that the first-mentioned monohaloalkane is a primary alkyl halide.

9. The process of claim 1 further characterized in that the first-mentioned monohaloalkane is a secondary alkyl halide.

10. The process of claim 1 further characterized in that the first-mentioned monohaloalkane is a tertiary alkyl halide.

11. A process which comprises reacting isopropylchloride with an aliphatic monoolefin in which at least one hydrogen atom is combined with each of the carbon atoms joined by the double bond in the presence of a Friedel-Crafts metal halide catalyst at a temperature such that the principal reaction of the process is the formation of a monochloroalkane having a molecular weight equal to the sum of the molecular weights of the reacting monochloralkane and monoolefin.

12. A process which comprises reacting tertiary butyl chloride with an aliphatic monoolefin in which at least one hydrogen atom is combined with each of the carbon atoms joined by the double bond in the presence of a Friedel-Crafts metal halide catalyst at a temperature such that the principal reaction of the process is the formation of a monochloroalkane having a molecular weight equal to the sum of the molecular weights of the reacting monochloroalkane and monoolefin.

13. A process which comprises reacting a primary butyl chloride with an aliphatic monoolefin in which at least one hydrogen atom is combined with each of the carbon atoms joined by the double bond in the presence of a Friedel-Crafts metal halide catalyst at a temperature such that the principal reaction of the process is the formation of a monochloroalkane having a molecular weight equal to the sum of the molecular weights of the reacting monochloroalkane and monoolefin.

14. The process of claim 1 further characterized in that the first-mentioned monohaloalkane is a primary alkyl halide and said aliphatic monoolefin is ethylene.

15. The process of claim 1 further characterized in that the first-mentioned monohaloalkane is a secondary alkyl halide and said aliphatic monoolefin is ethylene.

16. The process of claim 1 further characterized in that the first-mentioned monohaloalkane is a tertiary alkyl halide and said alliphatic monoolefin is ethylene.

17. The process of claim 5 further characterized in that said aliphatic monoolefin is ethylene.

LOUIS SCHMERLING.

REFERENCES CITED

The following references are of record in the file of this patent:

UNITED STATES PATENTS

| Number | Name | Date |
|---|---|---|
| 2,068,772 | Sixt | Jan. 26, 1937 |
| 2,297,564 | Kirkbride | Sept. 29, 1942 |
| 2,419,500 | Peterson et al. | Apr. 22, 1947 |

FOREIGN PATENTS

| Number | Country | Date |
|---|---|---|
| 261,689 | Germany | July 2, 1913 |
| 695,125 | France | Dec. 11, 1930 |
| 824,909 | France | Feb. 18, 1938 |

OTHER REFERENCES

Schmerling: "Jour. Am. Chem. Soc.," vol. 67, pages 1152–4 (1945).